(12) United States Patent
Kwatra et al.

(10) Patent No.: US 11,405,227 B2
(45) Date of Patent: Aug. 2, 2022

(54) SMART QUERY BUFFERING MECHANISM

(71) Applicant: International Business Machines Corporation, Armonk, NY (US)

(72) Inventors: Shikhar Kwatra, San Jose, CA (US); Ashraf M Awwad, Mississauga (CA); Victor Povar, Vancouver (CA); Zachary A Silverstein, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 17/082,437

(22) Filed: Oct. 28, 2020

(65) Prior Publication Data

US 2022/0131717 A1 Apr. 28, 2022

(51) Int. Cl.
| | |
|---|---|
| *G06F 15/16* | (2006.01) |
| *H04L 12/18* | (2006.01) |
| *G10L 15/22* | (2006.01) |
| *G10L 15/18* | (2013.01) |
| *H04L 67/56* | (2022.01) |
| *H04L 67/02* | (2022.01) |

(52) U.S. Cl.
CPC ...... *H04L 12/1827* (2013.01); *G10L 15/1815* (2013.01); *G10L 15/22* (2013.01); *H04L 67/56* (2022.05); *H04L 67/02* (2013.01)

(58) Field of Classification Search
None
See application file for complete search history.

(56) References Cited

U.S. PATENT DOCUMENTS

| | | |
|---|---|---|
| 8,060,390 B1 | 11/2011 | Overstreet |
| 2008/0120101 A1 | 5/2008 | Johnson et al. |

(Continued)

OTHER PUBLICATIONS

Anonymous, "Auto moderated conference calls and online meetings," IP.com Disclosure No. IPCOM000241516D, Publication Date: May 8, 2015.

(Continued)

*Primary Examiner* — Quang N Nguyen
(74) *Attorney, Agent, or Firm* — Jeffrey S LaBaw; Erik K Johnson

(57) ABSTRACT

A method, apparatus and computer program product for controlling a web-based presentation is described. In an embodiment of the invention, the already presented content and future content of the presentation is analyzed. When a user question is received from a user terminal communicatively coupled to the web-based presentation, the user question is buffered so that the system can determine whether content answering the user question has been or will be presented in the presentation based on the analyzed content. Responsive to the determination, the system will perform an action. In embodiments, the system will provide the user one of the following: 1) the system will provide a notification related to the answering content in a user interface, if the answering content has been, or will be, presented in the presentation, and maintaining the user question in a buffer state; or 2) the system will release the user question from the buffer state to allow the user question to be forwarded to a presenter of the presentation if the content has not been, and will not be, presented.

23 Claims, 8 Drawing Sheets

(56) References Cited

U.S. PATENT DOCUMENTS

| | | | |
|---|---|---|---|
| 2012/0303614 A1 | 11/2012 | Mercuri et al. | |
| 2013/0071831 A1 | 3/2013 | Jones et al. | |
| 2014/0372908 A1* | 12/2014 | Kashi | H04L 65/4038 |
| | | | 715/753 |
| 2016/0048545 A1 | 2/2016 | Zhang et al. | |
| 2016/0203208 A1* | 7/2016 | Anderson | G06F 16/353 |
| | | | 707/722 |
| 2018/0018507 A1* | 1/2018 | Chetlur | H04N 21/44008 |
| 2018/0137450 A1 | 5/2018 | Gutman et al. | |
| 2019/0295022 A1* | 9/2019 | Daniels | G06F 16/4393 |
| 2020/0097598 A1* | 3/2020 | Anderson | G06K 9/6223 |
| 2020/0211408 A1* | 7/2020 | Faulkner | G09B 7/02 |
| 2020/0333997 A1* | 10/2020 | Metzar | G10L 21/0316 |
| 2021/0365524 A9* | 11/2021 | Anderson | G06F 16/9038 |

OTHER PUBLICATIONS

Anonymous, "Conference Call Analytics to Generate Meeting Moderation Recommendations," IP.com Disclosure No. IPCOM000205838D, Publication Date: Apr. 5, 2011.

Anonymous, "System and Method to Detect Question in Communications and Preemptive Answering," IP.com Disclosure No. IPCOM000240790D, Publication Date: Mar. 2, 2015.

* cited by examiner

QUESTION: WHAT IS REINFORCEMENT MACHINE LEARNING?

ANSWER: THE ANSWER TO YOUR QUESTION IS FOUND IN SLIDE 4

SLIDE 4

701

QUESTION: WHEN SHOULD I USE MACHINE LEARNING?
ANSWER: PLEASE REFER TO THE FOLLOWING FAQS WHICH MAY ANSWER
　　　　　YOUR QUESTION
　　　　　1) SUPERVISED ML USE
　　　　　2) UNSUPERVISED ML USE
　　　　　3) NEURAL NETWORKS USE

703

QUESTION: WHAT CLUSTERING ALGORITHM IS USED?

RESPONSE: YOUR QUESTION IS ON QUEUE FOR THE PRESENTER

SMART QUERY BUFFERING MECHANISM

BACKGROUND OF THE INVENTION

This disclosure relates generally to user interfaces. More particularly, it relates to a user interface for conducting a live web conference session.

When presenting in a live web-conference session, a presenter will often be interrupted by other participants. Often another participant will ask questions which have been or will be addressed by the presenter in other parts of the presentation. The question may have been addressed in a prior slide when the other participant was not paying attention or did not understand the importance of the slide because of lack of context. Alternatively, the question will be answered in upcoming material because of the organization choices for the presentation made by the presenter.

These superfluous questions become redundant, time inefficient and detract from the presentation for other participants.

Further improvements in user interfaces are needed to address this problem.

BRIEF SUMMARY

According to this disclosure, a method, apparatus and computer program product for controlling a web-based presentation. In an embodiment of the invention, the already presented content and future content of the presentation is analyzed. When a user question is received from a user terminal communicatively coupled to the web-based presentation, the user question is buffered so that the system can determine whether content answering the user question has been or will be presented in the presentation based on the analyzed content. Responsive to the determination, the system will perform an action. In embodiments, the system will provide the user one of the following: 1) the system will provide a notification related to the answering content in a user interface, if the answering content has been, or will be, presented in the presentation, and maintaining the user question in a buffer state; or 2) the system will release the user question from the buffer state to allow the user question to be forwarded to a presenter of the presentation if the content has not been, and will not be, presented.

In the apparatus embodiment, a processor and computer memory holding computer program instructions executed by the processor for controlling the web-based presentation, for performing a method as described above are included.

In the computer program product embodiment, the computer program product is stored in a non-transitory computer readable medium for use in a data processing system, the computer program product holding computer program instructions executed by the data processing system for controlling a web-based presentation, for performing a method as described above are included.

In another embodiment of the invention, a method for controlling a web-based presentation including analyzing the content of the web-based presentation receives a user question from a user terminal communicatively coupled to the web-based presentation. The user question is buffered while determining whether content answering the user question is presented in the presentation. Based on the analyzed content which includes whether the answering content will be presented in the presentation, the user interface of the web-based presentation is modified.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 7 is a diagram of a user interface for a user according to an embodiment of the invention.

DETAILED DESCRIPTION OF AN ILLUSTRATIVE EMBODIMENT

At a high level, the invention provides a method, system and computer program product for conducting a web conference. When a participant signals that they want to ask a question, before the question is forwarded to the presenter, the question is buffered. While the question is held, the system searches for whether the question is answered in the presentation. If the answer is found in the presentation, the answer is presented to the participant. If the answer is not found in the presentation, the question will be forwarded to the presenter.

The embodiments will now be described more fully herein with reference to the accompanying drawings are exemplary. The invention may, however, be embodied in many different forms and should not be construed as limited to the example embodiments set forth herein. The embodiments are provided so that this disclosure conveys the principles of the invention; variations on these examples are within the scope of the invention as will be understood by those skilled in the art. In the description, details of well-known features and techniques may be omitted to avoid unnecessarily obscuring the presented embodiments.

Figure 1:
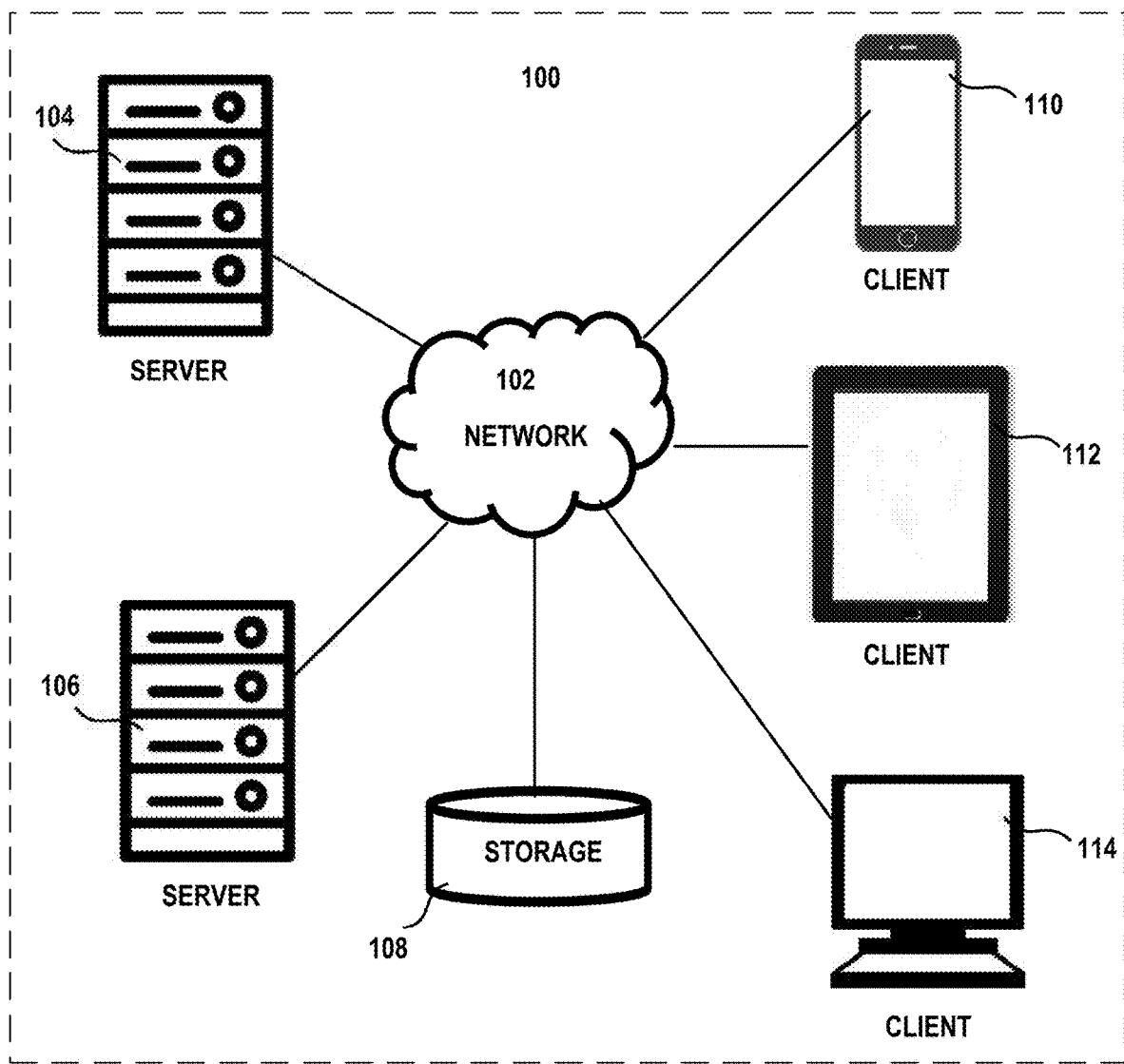
FIG. 1 depicts an exemplary block diagram of a distributed data processing environment in which exemplary aspects of the illustrative embodiments may be implemented.
Figure 2:
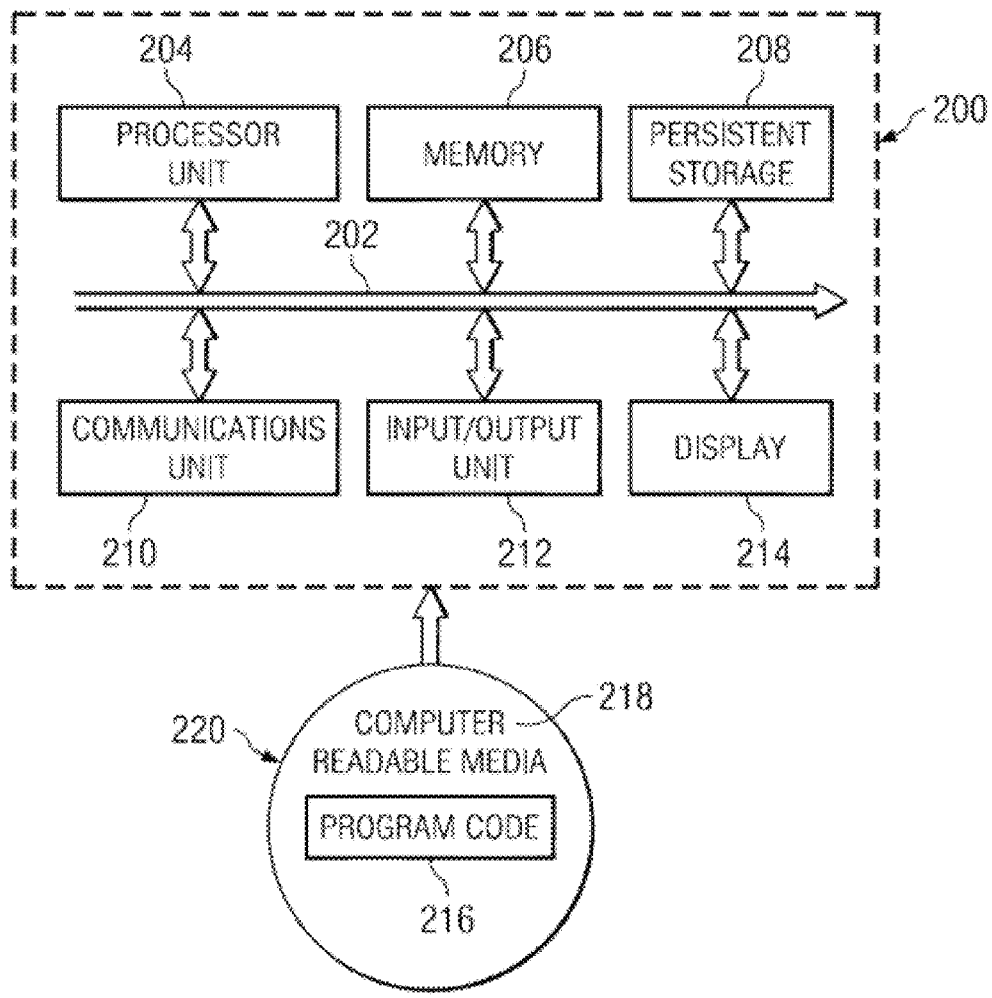
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with network storage unit 108. In addition, clients 110, 112, and 114 are also connected to network 102. These clients 110, 112, and 114 may be, for example, smartphones, tablet computers, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown. One or more of the server computers may be a mainframe computer connected to network 102. Mainframe computer can be, for example, an IBM System z mainframe running the IBM z/OS operating system. Connected to the mainframe may be mainframe storage unit and workstations (not pictured). The workstations can be either a personal computer connected directly to the mainframe communicating over a bus, or a console terminal connected directly to the mainframe via a display port.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 114 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit(s) 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Further, input/output unit may provide connections to a microphone for audio input from a user and a speaker to provide audio output from the computer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 12 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++, C #, Objective-C, or the like, and conventional procedural programming languages such as Python or C. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

The techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities.

The embodiments will now be described more fully herein with reference to the accompanying drawings are exemplary. The invention may, however, be embodied in many different forms and should not be construed as limited to the example embodiments set forth herein. The embodiments are provided so that this disclosure conveys the principles of the invention; variations on these examples are within the scope of the invention as will be understood by those skilled in the art. In the description, details of well-known features and techniques may be omitted to avoid unnecessarily obscuring the presented embodiments.

In embodiments of the invention, when a participant signals that they want to ask a question, before the system allows the question to be forwarded to the presenter, or allows the participant microphone to be unmuted for the web conference, the system records the participant's spoken question. This enables the system to hold or buffer the question while operations occur in the background. A natural language processing (NLP) module will render the question into a usable form to perform a lookup whether the answer to the question is already in the presentation. The search module uses the NLP output to understand the question spoken by the user and generates the answer if present in the presentation. In embodiments, if the answer to the question was already answered by a previous slide, the answer is presented to the user, either by referring the participant to the previous slide or in a new popup window. In embodiments of the invention, if the answer will be answered by a future slide, the system will inform the user that the question will be addressed in the future. Alternatively, a popup window can present the answer in the future slide to the user. In other embodiments, the user question is input in a written form rather than in a spoken form. The interface used to input the question can also be used to present the answer, e.g., a chat-like user interface.

In some embodiments, the system will analyze the user's question to determine if it is appropriate for the presentation, e.g., it is within the scope of the presentation to avoid questions that will sidetrack the presentation. If not deemed appropriate, the system will block the question from interrupting the presentation. A notification may be sent to the participant asking the out-of-scope question. In some embodiments, the out-of-scope questions are collected and forwarded to the presenter at a later time, so that they can be answered by the presenter using a different means, such as email.

If the system determines that the question has not been already answered in the presentation materials, the question is appropriate for the presentation and there is no future content that will address this question, the system will un-mute the participant. The presenter will hear the question, possibly with some delay, but the question will eventually be relayed to the presenter. The presenter may design the presentation so that questions can be forwarded to him periodically at predetermined times or gaps in the presentation. In embodiments of the invention, a module will a set of break points in the presentation from the presenter. While the presentation is being presented, the system will determine when a next break point of the set of break points will be in the presentation. The system will wait until the next break point before releasing the user question from the buffer state.

In alternative embodiments, the system can determine if the presenter is talking and wait for a gap in the presentation to relay the question. In yet other embodiments, a natural break in the presentation such as a slide change can be the event which triggers relaying the question to the presenter. While the participant is waiting, a notification may be sent to the participant in some embodiments that his question is in queue.

In embodiments of the invention, the presentation material can be augmented by additional question and answer material. For example, as the presenter may have given a particular presentation or a similar presentation at a prior date, questions and answers from the previous session are stored in a frequently asked questions (FAQ) database. If the presenter is a subject matter expert, there may be other prepared materials which can augment the presentation materials. In some embodiments, a chatbot is used to present the answer to the questioning participant in the chat interface.

In embodiments, of the invention, the system will group the questions, i.e. from multiple participants, by intent to prevent the same questions from being relayed or asked. In embodiments of the invention, the grouping occurs for the questions which have not been answered by the presentation or the supporting materials relevant to the presentation. The group of questions with the highest frequency can be moved to the front of the queue for the presenter to address first. An NLP analysis can be performed on the group of similar questions to determine which is the most complete or representative of the group of questions. Only the most complete or representative of the group of questions is forwarded to the presenter, or a reduced subset of the group of questions.

Figure 3:
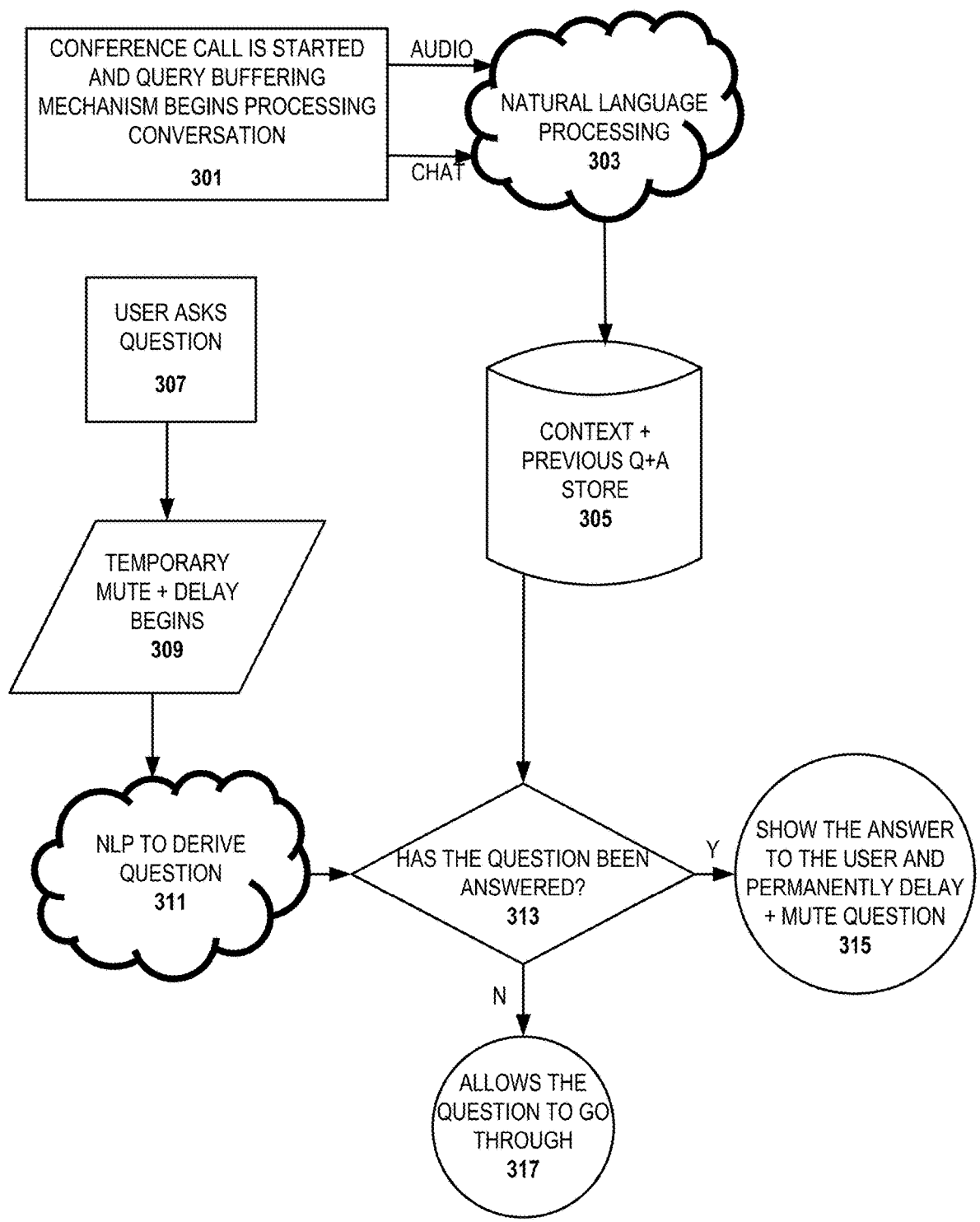
FIG. 3 depicts a flow diagram for an embodiment of the present invention for conducting a web conference.

One embodiment of the invention is depicted in FIG. 3. In step 301, the conference call system is set up according to the embodiment of invention. In the embodiment, the presentation, as much as required, is downloaded to the participants. The audio and chat functions are enabled using the query buffering function as described herein. That is, rather than immediately forwarding a question to the presenter, buffering happens so that additional processing can occur without interrupting the presentation. In this step, the query buffering mechanism begins listening to the audio conversation and processing chat for the presentation. Particularly relevant to the present invention, the participant inputs are reviewed for questions for the presenter. In preferred embodiments, these tasks are performed by the smart listener module.

In step 303, the natural language processing (NLP) module is engaged. In a previous step, the presentation is converted into a usable format, e.g., written to a "document", so that as the presentation proceeds, a user context can be abstracted so that a user question can be understood in context, creating a user context for the question. In the embodiment, the "context document" is in a usable format such that it can be queried later in the process. The context document can contain time references to when slides are presented in the presentation and also to an NLP rendering of the audio from the presenter and other participants. The context document is used to determine a current context for a user question so that the most relevant content in the presentation materials can be selected. In preferred embodiments, the presentation material is ingested by a machine learning component to create the usable format. In embodiments of the invention, a product in the IBM Watson™ family of products is used to create the context document. As is described, the presentation material includes the written and audiovisual material as well as the audio and chat streams captured by the system. This information is also selectively stored in a frequently asked questions (FAQ) database or other suitable knowledge store, in a database or other suitable format, step 305.

In step 307, a user asks a question during the presentation, either in the audio or chat channels. In step 309, the question is temporarily delayed and muted (if needed), so that additional processing can occur without interrupting the presentation. In step 311, the NLP module derives the meaning(s) of the question into a usable form. In step 313, the system determines whether the question has been answered in the presentation. In this step, the system reviews a set of questions that have been answered in the presentation, either prior to the time that the question was asked or in slides which will be presented after the presentation. In embodiments of the invention, a cognitive discovery functionality is used against the conversation during the presentation, e.g., stored in the context document, and presentation documents to detect if the question has been or will be answered. The context document created in step 303 is referred to by the cognitive discovery functionality to determine a current context for a user question so that the most relevant content in the presentation materials can be selected.

In other embodiments, the questions and answers are indexed in the FAQ database, and the system uses a search engine to find the answer.

If question was answered, step 315, the system holds the questions from the user participant for the duration of the presentation and displays the answer in an interface for that specific user. Also, in this step, if question will be answered in the upcoming material, the system maintains the hold on the question from the user and notifies the user that the question will be answered in the upcoming material.

Embodiments of the invention determine whether the question is out of scope/inappropriate for the presentation. For example, a question about college football might be regarded as out of scope for a presentation on machine learning. Determining whether a question is out of scope can be performed by a semantic analysis comparing the words used in the question to a set of keywords in the presentation. If the question is out of scope, the system holds the question from the user for the duration of the presentation and notifies the presenter of this question after the presentation. The system also informs the participant that the question is out of the scope of the presentation in a notification. The notification may inform the participant that the question is being forwarded to the presenter for a response at a later time. The presenter may want to follow up with the user after the presentation using another channel or consider if the system has correctly classified the question as out of scope or inappropriate. In future versions of the presentation, the presenter may want to include the question in the presentation or in a set of FAQs.

If question is not answered in the presentation or supporting materials, after buffering, the system allows the question to go through to the presenter.

In embodiments of the invention, the questions which are not answered in the presentation or supporting materials are grouped by intent to prevent duplicates. Once the duplicates are eliminated from a respective group, the system allows the remaining questions, i.e. a reduced group of questions, to go through the web conference user interface to the presenter. The system may pick the most complete or representative question of the group of questions with the same intent so that the reduced group of questions may be a single question.

The questions and answers are logged by the system. In embodiments of the invention, both answered and unanswered questions are fed into a learning mechanism to improve system quality. The system quality can be improved by adding new questions and answers to a set of FAQs as well as understanding different ways that user ask questions about the presentation subject matter. In addition, the logged questions and answers provide information to the presenter to know the audience topics of interest.

There is the presumption in the above embodiment that the answer is not in the present slide, as that is an unusual case. However, in an alternative embodiment, it may be an appropriate time to let the participant to raise the question and should be allowed. In this embodiment, the cognitive discovery functionality determines that the answer is in the present slide. In embodiments, the user may be shown the specific place in the current slide that answers the question by the cognitive discovery functionality within the interface. The user may feel that the slide does not address the question. With additional user input, e.g., "Does this answer your question, yes, no?", and so with a negative response, the system presents the question to the presenter.

While the embodiment described above envisions an audio/visual presentation in which participants contact the presenter with a spoken question, in other embodiments of the invention, the participants contact the presenter using a written interface in which the questions are input. Though a written question is not as distracting to the set of participants, questions that the presenter views can still be distracting to the presenter and with a distracted presenter, the presentation will suffer.

In embodiments of the invention, the audio from the presenter on an audio channel of the presentation is captured and analyzed by an NLP application and converted into a form that can be used by the learning system. Thus, the presentation materials which may already include both text and image information, e.g., a slideshow, are supplemented by the actual words spoken by the presenter. These words can also provide the answer to the participants' questions. The spoken words from other participants which are allowed to become part of the presentation after a buffering period may also be useful to determine a context of a question. In embodiments of the invention, those words will also become part of the context document.

Figure 4:
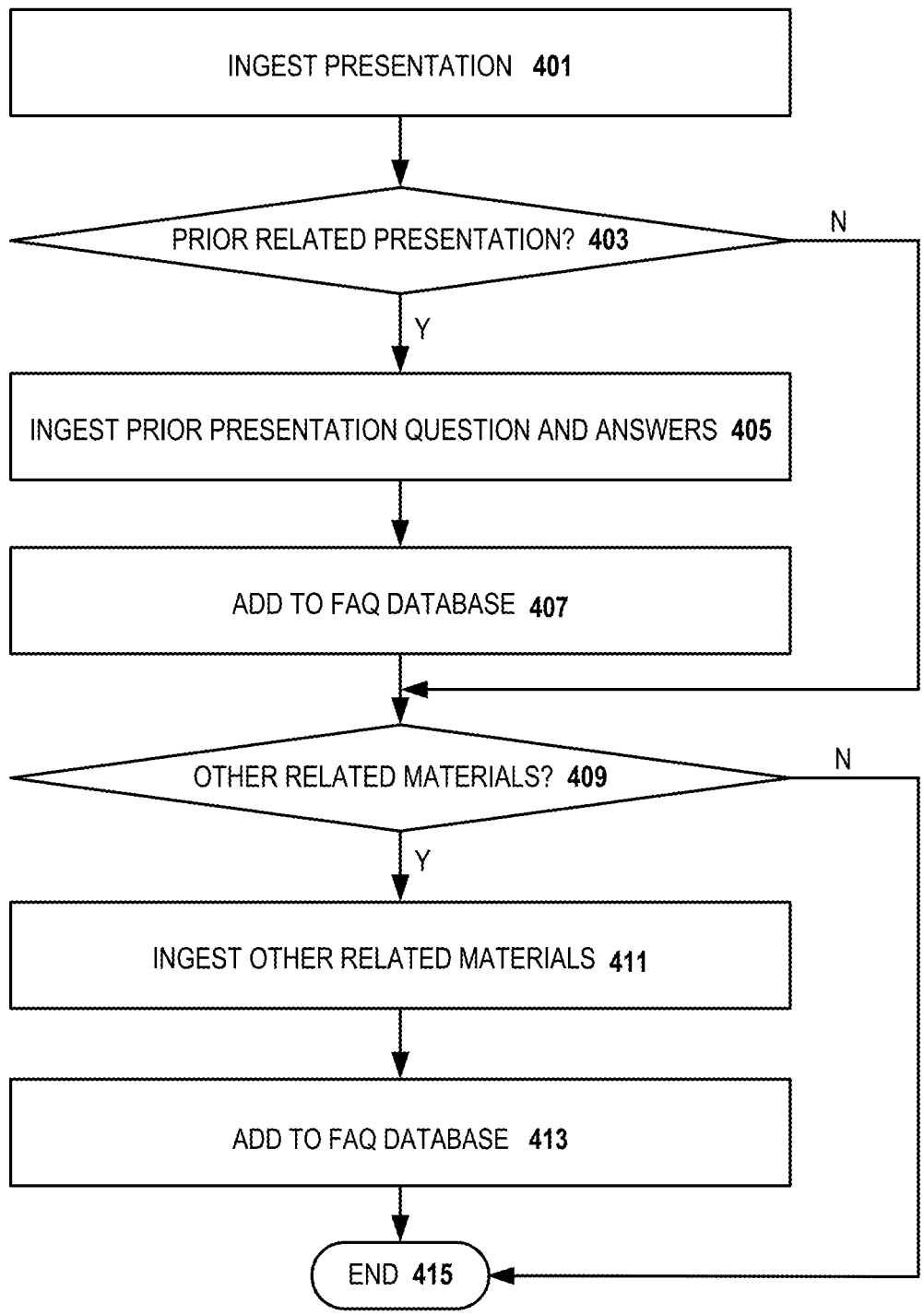
FIG. 4 depicts a flow diagram for an embodiment of the present invention for preparing the system to conduct a web conference.

FIG. 4 depicts a flow diagram for an embodiment of the present invention for preparing the system to conduct a web conference. In step 401, the presentation is ingested by the machine learning so that the presentation contents can be searched by the system during the presentation for answers to questions asked by participants in the web conference. In embodiments of the invention, the answers can be tiered in a hierarchy: 1) a simple answer to the question is presented: Q: What is the largest waterfall in North America by volume? A: Niagara Falls; 2) A slide on which the answers occurs; and 3) a selection of FAQs related to the understood question. The hierarchy of answers may be linked by hyperlinks or other GUI controls in a first panel. The machine learning prepares the material from the presentation so that the Q & A interface can be presented to participants in the future web conference. Although not depicted, the information can be added to a FAQ database.

In step 403, the system determines whether there is a previous version of the web conference presentation. If so, the prior presentation and any associated question and answers, FAQ database and other materials marked as associated with that prior presentation are ingested, step 405. Note that these materials may be already ingested and categorized by the machine learning and so this step may be a matter of associating the already ingested material with the current presentation. Step 407 represents that all of the ingested material associated with the prior presentation may be stored in a single FAQ database, rather than a plurality of information types. In other embodiments in which the related materials are stored in a plurality of forms, it still may be useful to store the presentation information in the FAQ database. However, this step is not performed in some embodiments of the invention.

There may be other materials prepared by the presenter related to the topic. There may be related materials of which the presenter is aware but prepared by others. This may be the first time that the presenter has prepared a presentation on the topic. Thus, in step 409, the system searches for other materials that the presenter has designated as related to the current presentation. In preferred embodiments, to give the presenter a measure of control, only those materials designated by the presenter are used. In alternative embodiments, a general search of the available knowledge can be made by the system and ingested by the system. In step 411, the other related materials are ingested. In embodiments in which the related material is compiled into a FAQ database, step 413, the pertinent, related ingested material is added to the FAQ database.

The process ends, step 415, once the presentation, prior versions of the presentation and related material have been ingested and converted into a usable form. Those skilled in the art will note that in different embodiments, the information may be converted into a plurality of different forms.

Figure 5:
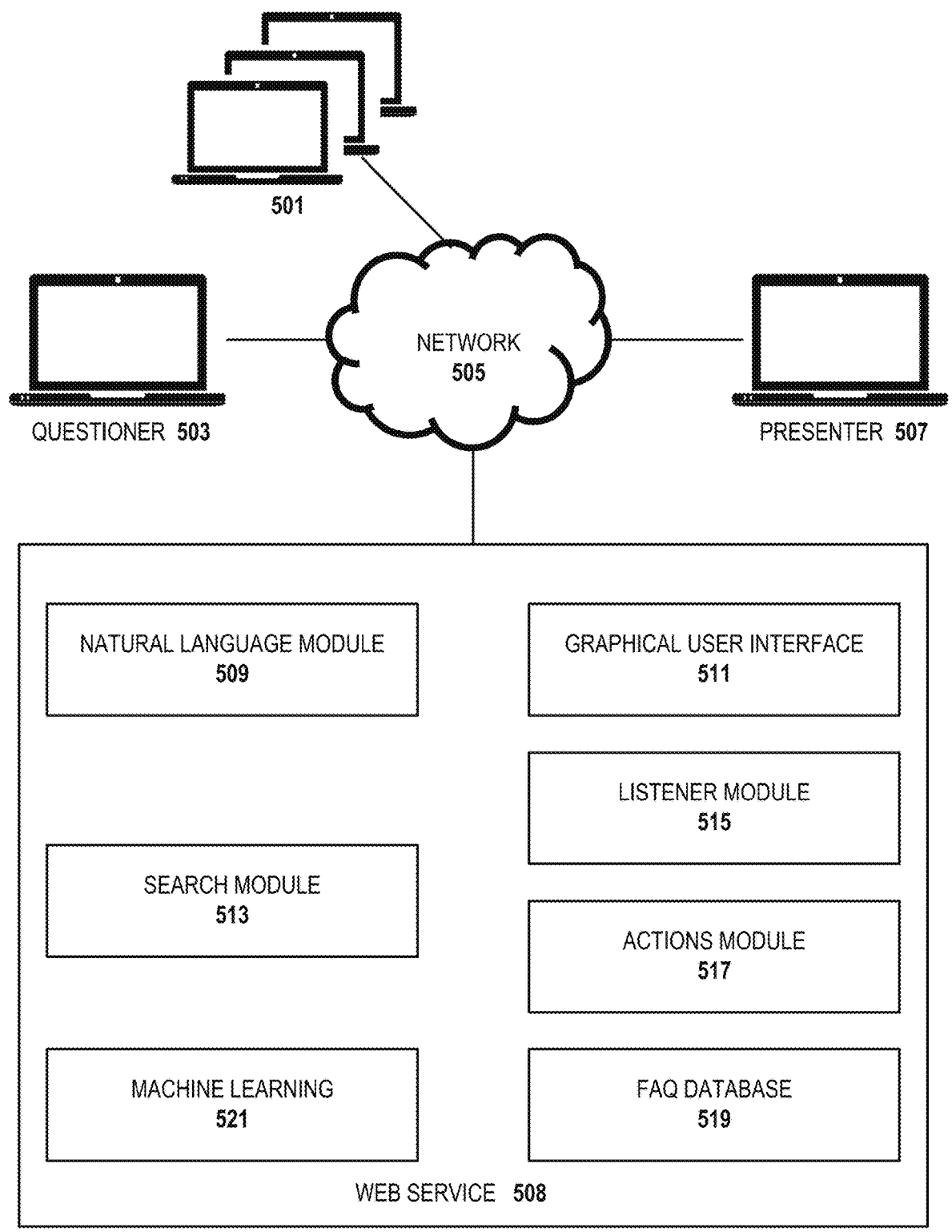
FIG. 5 is an architectural diagram of one embodiment of the invention.

FIG. 5 is an architectural diagram of one embodiment of the invention. A set of participants 501 and the questioner participant 503 are connected via a network 505 to the presenter 507. The web conference is run by the web service 508.

In some embodiments, the web service is divided into a plurality of modules. For example, natural language module (NLP) 509 is used to understand the questions posed by the participants and convert them into a usable format for other modules in the web service. The NLP module 509 can perform other NLP tasks for other modules in the web service on an as needed basis. The graphical user interface module 511 is used to present the presentation of the presenter, i.e. change slides at the appropriate times, present a chat interface and also to present the question and answer interface of the present invention whether within the chat interface or another interface.

A search module 513 is used to search the presentation and designated related materials for answers to one or more currently posed questions. In some embodiments, the search module only searches the actual presentation for an answer. However, in preferred embodiments, the system has already indexed or ingested the material from the presentation, prior related presentations or designated "related" materials into a database or other usable formats.

Many aspects of the system can be found in the smart listener module 515 and the actions module 517 in embodiments of the invention. The listener module 515 will identify, classify, and group responses from the participants so that the system or the presenter, as appropriate, can respond. The audience participants 501, 503 use audio or text (chat) interfaces to submit responses. The listener module can categorize the response, that is, whether the response is a question, feedback, vote, comment or complaint. In embodiments of the invention, the classified response uses the response type with weight and more info to aid the priority of the action needed (e.g., question, complaint, high priority). In embodiments of the invention, only questions or complaints would be forwarded to the presenter, as inputs in these classifications need to be acted upon. This step determines how relevant to the presentation, the response or the question is. If the question or response is relevant, there is higher weight assigned to the answer. That is, a higher weight will more likely create an interruption to the presentation. If the response or question is not relevant, then the system discards the response, or will add it to a list of questions that could be addressed by the presenter at a later time. The listener module 515 preferably employs semantic content analysis, either natively or through the NLP module 509. Semantic content analysis is used during the online conference session to understand questions from the participants. For example, the semantic content analysis performs an analysis of the terms and words in the initial question/response for terms that are relevant for a search of a content document created from the ingestion process. Semantic content analysis can also be used to analyze the audio of the presenter to prepare the context document used to place a participant's question in the proper context.

In embodiments of the invention, the web conference participants are identified by login or IP based information. In some embodiments, the speaker (i.e., presenter, questioner, other participant) can be identified based on a Mel Frequency Cepstral Coefficients (MFCC) based speaker identification. Machine learning such as long short-term memory (LSTM) or other artificial recurrent neural network (RNN) architectures are used for command or question buffering by the smart listener module.

In embodiments of the invention, the following operations are performed by the listener module 515. The information from the participant question is run through a sentence parser and the parsed tokens are obtained. Semantically-adaptive searching methods are used to reduce the searching range in a database, e.g., a FAQ database, to find a relevant answer(s) from the presentation or accompanying database via NLP. The MFCC application or other method can be used for speaker identification which is useful for establishing the context of a question.

In embodiments, the listener module 515 uses statistical clustering and classification methods to extract audio and visual contextual conversation information features for the participant question, index the feature space, and classify relevant information and other pieces of information into semantic categories. As an example of statistical clustering, K-means clustering is used in certain embodiments to cluster the relevant data. As is mentioned elsewhere, supervised, or unsupervised learning is used for labeling the data. As is known, a weighted variation of Euclidean distance can be used for the phrase comparison to determine whether the current question is similar to other questions posed by participants. In embodiments, the Euclidean distance compares all components in the feature vector of the question with equal weightings of similar components of other questions. The listener module 515 then eliminates duplicate questions in a given group of questions to create a reduced group of questions. In some embodiments, grouping questions is used for those questions that are not answered in the presentation or supporting materials. The question that are answered in the presentation or supporting materials can be handled by the appropriate notification to the user.

The listener module 515 counts and groups similar questions to identify the severity of the event/question. For example, with an event where 50% of the remote audience is asking questions, because they cannot see the presentation screen, the event/question needs to be surfaced immediately to the presenter so that the web conference can be corrected or restarted.

The listener module 515 hands over the result of the semantic analysis and clustering to the actions module 517.

The actions module 517 is responsible for the decision whether to interrupt the presenter to alert the presenter to a participant question or to a high severity event which affects a plurality of participants which needs immediate attention. Examples of presentation actions which need immediate attention include video or audio problems which could be rectified by increasing the volume of the presenter, advancing a slide or maximizing the display on an item of the presentation. The actions module 517 also makes the decision not to interrupt the presenter and present an answer to the participant instead.

The actions taken be the actions module 517 can be configurable from manual to automatic modes. The manual mode can be used to allow the system to configure the listener module 515 to collect specific data and score them based on the user selected mode. For example, in automatic mode the listener module 515 can listen to online audience navigation in the presentation channel and decide that the behaviors of many attendees indicate a change is needed. For example, when many attendees are trying to increase the voice or increase the screen, this will indicate to the listener module that there is something that is not clear in the presentation. Unclarity in the presentation can be due to either voice, slides, text, slow connection problems. If a majority of the participants share the same behavior, this will tend to cause the actions module 517 to interrupt the presenter to rectify the situation. The actions module can suggest a recommended action. In embodiments of the invention, the actions module provides a pop-up notification to notify the presenter or hosting administrator to modify the presentation, e.g., raise the volume, or in severe problems, reconnect the participants to clear the issue being experienced by the attendees.

In the manual mode, the presenter has greater control over the presentation. The presenter may choose to probe manually for settings needed the clarity of voice. In manual mode, the presenter can select how the actions module 517 handles actions on questions and feedback. That is, the presenter can specify when questions are presented during the presentation, e.g., only after a slide, or a at designated points in the presentation. By constraining questions to designated points in the presentation, the selection will have the effect of consolidating participant questions to avoid duplicate questions.

In embodiments of the invention, the listener module will continue handing over the appropriate information to the action module.

The frequently asked questions database 519 is representative of a database that contains data from past presentations or related material that has been designated by the presenter as being related to the current presentation. In some cases, the present is a subject matter expert (SME) on the current topic. There may be a presenter web site in which a forum is presented in which the SME or other forum members answer questions of the followers, or the presenter may be an expert on a social media website in which followers' questions are presented and answered. Additionally, the presenter may have performed significant research on the topic. All of these may provide additional material which can provide answers to the participants' questions. Depending on the perceived reliability of the related information, the presenter may designate the information from these sources as pertinent to the presentation. Further, the presenter may designate respective information as belonging to certain levels of a hierarchy of information to be displayed in the interface as the participant drills down on the information. The information in the FAQ database 519 may be edited or annotated by the presenter according to the perceived accuracy of the information.

The machine learning module 521 is used in some embodiments of the invention. In embodiments, the actions module can use historical data to learn about the recommended actions vs. the meeting setup specified by the presenter. Among the features used as the input features include whether the web conference presentation includes remote participants and if so many or what proportion, a topic or title of the presentation, the number of the conference audience, the number conference lines for the audience and the channels used to connect to the conference.

The machine learning module 521 is also used in some embodiments of the invention to ingest the information from the presentation, the previous related presentations and other related materials. In some embodiments, the machine learning 521 is used to provide the answers to the participant questions. As is known, reconfigurable weights are applied on the set of data inputs to determine the outputs of the machine learning. As an example of suitable machine learning used in some embodiments for image analysis, a python+workflow for OpenCV for Regional Convolutional Neural Network (R-CNN) contextual analysis enables the recommended set of actions to be performed by the action module. As is known to those skilled in the art, OpenCV is an image segmentation algorithm. In embodiments of the invention, the system captures the information in the presentation. As the presentation will most likely have images, the system will need to extract information from the images.

For text and audio information, other known algorithms can be used to extract information. For example, text transcription can be performed using natural language processing (NLP). Audio information can be analyzed using known speech recognition algorithms.

Figure 6:
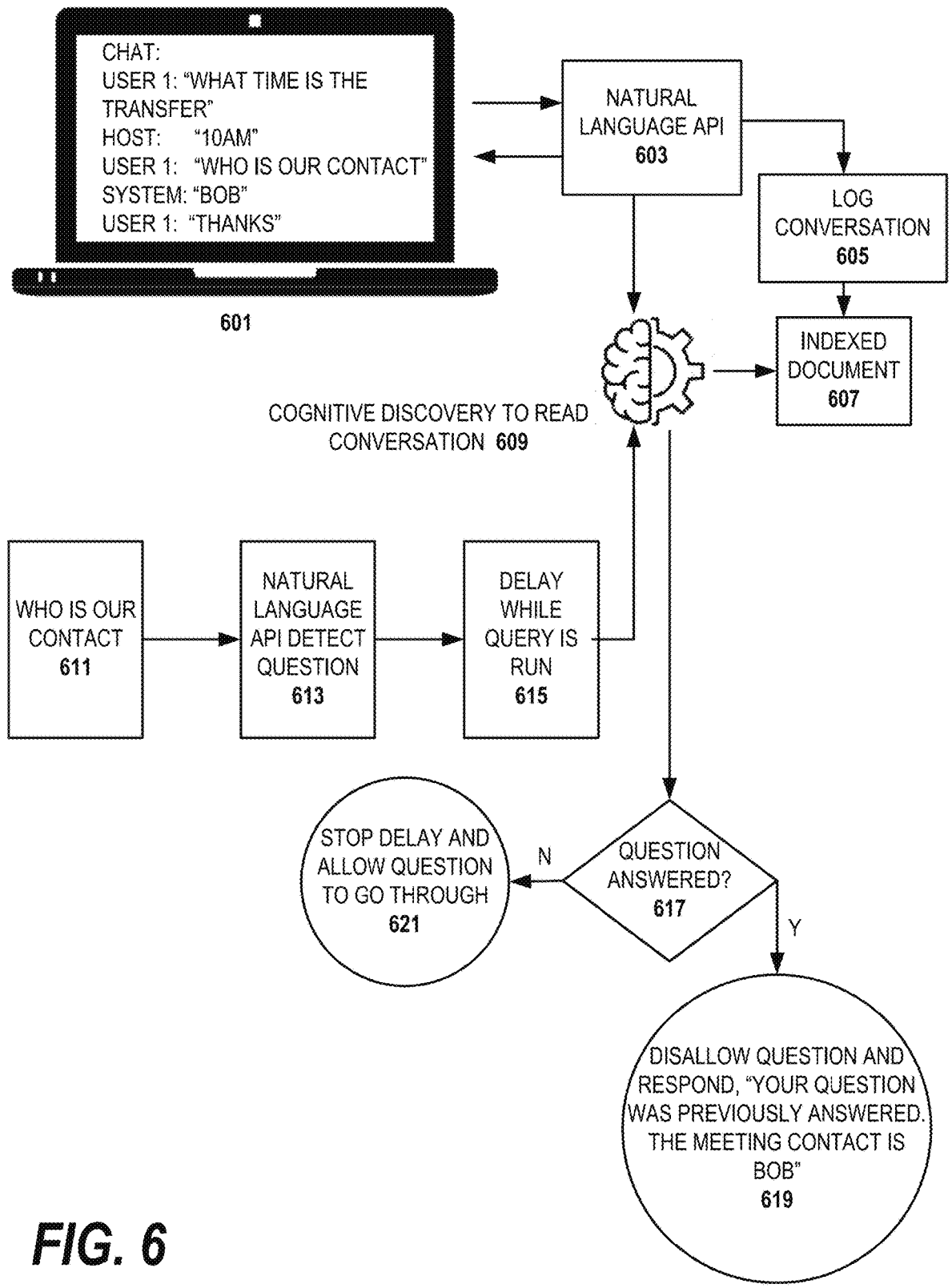
FIG. 6 depicts a flow diagram for another embodiment of the present invention for conducting a web conference.

FIG. 6 depicts a flow diagram for another embodiment of the present invention for conducting a web conference. Element 601 illustrates a chat that may occur during a presentation. Because of space limitations the presentation itself is not illustrated but would also be displayed on the screen. Those skilled in the art will appreciate that the chat could be a spoken chat channel between the participant(s), the chatbot and the presenter (host).

As displayed in the screen, the chat contains a first question from: user 1: "What time is the transfer?" followed by a response from the presenter (host): "10 AM. This illustrates the case where the chatbot cannot find an answer in the presentation materials. The chat also contains a second question from user 2: "Who is our contact?" In this case, the system can respond "Bob" because this answer is in the presentation or supporting materials. It may be a question that was asked by another user in a previous presentation. The chat also contains a response from user 2: "Thanks." The system may recognize this as a pleasantry which is not a question that needs to be responded to. Some chatbots are programmed to respond to such pleasantries. However, in preferred embodiments, the system is programmed not to interrupt the presentation for some types of user input such as pleasantries, feedback, votes, comments or complaints, which are not questions directed to the presenter.

In this embodiment, the chatbot 603 interacts with the user using a natural language API. The conversation is logged according to the understood words in step 605. In some embodiments, an indexed document 607 can also be produced for the use of a search engine. The indexed document can include the audio from the presenter, the time stamps from when the slides are changed and other items related to the presentation to improve the search results. A machine learning system 609 can employ cognitive discovery functionality to read the logged or indexed conversation and create annotations which supplement the indexed document 607. The indexed document 607 also contains presentation material and supporting material in some embodiments of the invention.

Step 611 represents a portion of the chat: the question "Who is our contact?". As shown in step 613 the natural language API of the chatbot detects that this phrase is a question which should receive a response. The system introduces a delay, buffering the question, while query is processed in step 615. The machine learning 609 determines whether the question is answered in step 617. For this question, the machine learning 609 determines that the question was answered in the presentation or supporting materials. Therefore, it disallows question from being relayed to the presenter and responds, "Your question was previously answered. The meeting contact is Bob" in step 619. If instead the question was not answered, e.g., the prior question "What time is the transfer?", the system stops the delay of the question and allows the question to go through the web conference channels to the host presenter, step 621, so that the host can respond "10 AM".

FIG. 7 is a diagram of a user interface for a user according to an embodiment of the invention. In the first panel 701, the user types the question: "What is Reinforcement Machine Learning?" into the NLP interface. In this case, the system was able to find the answer in the presentation materials and responds: The answer to your question is found in slide 4. A thumbnail of slide 4 may be presented in the panel.

In the second panel 703, the user types the question: "When should I use machine learning?" In this case, the chatbot was not able to find the answer in the presentation materials but was able to find some FAQs which appear relevant. The system responds: please refer to the following FAQs which may answer your question 1) Supervised ML Use 2) Unsupervised ML Use 3) Neural Network Use. The listing of the FAQs contains the entire FAQ text or might be a summary with a hyperlink to the full text depending on the available display space in the panel.

In the third panel 705, the user types the question: "What clustering algorithm is used?" In this example, the system is unable to find a suitable answer in either presentation or the supporting material. Instead, the system response: "Your question is on queue for the presenter" indicates that the question has been forwarded to the presenter.

Figure 8:
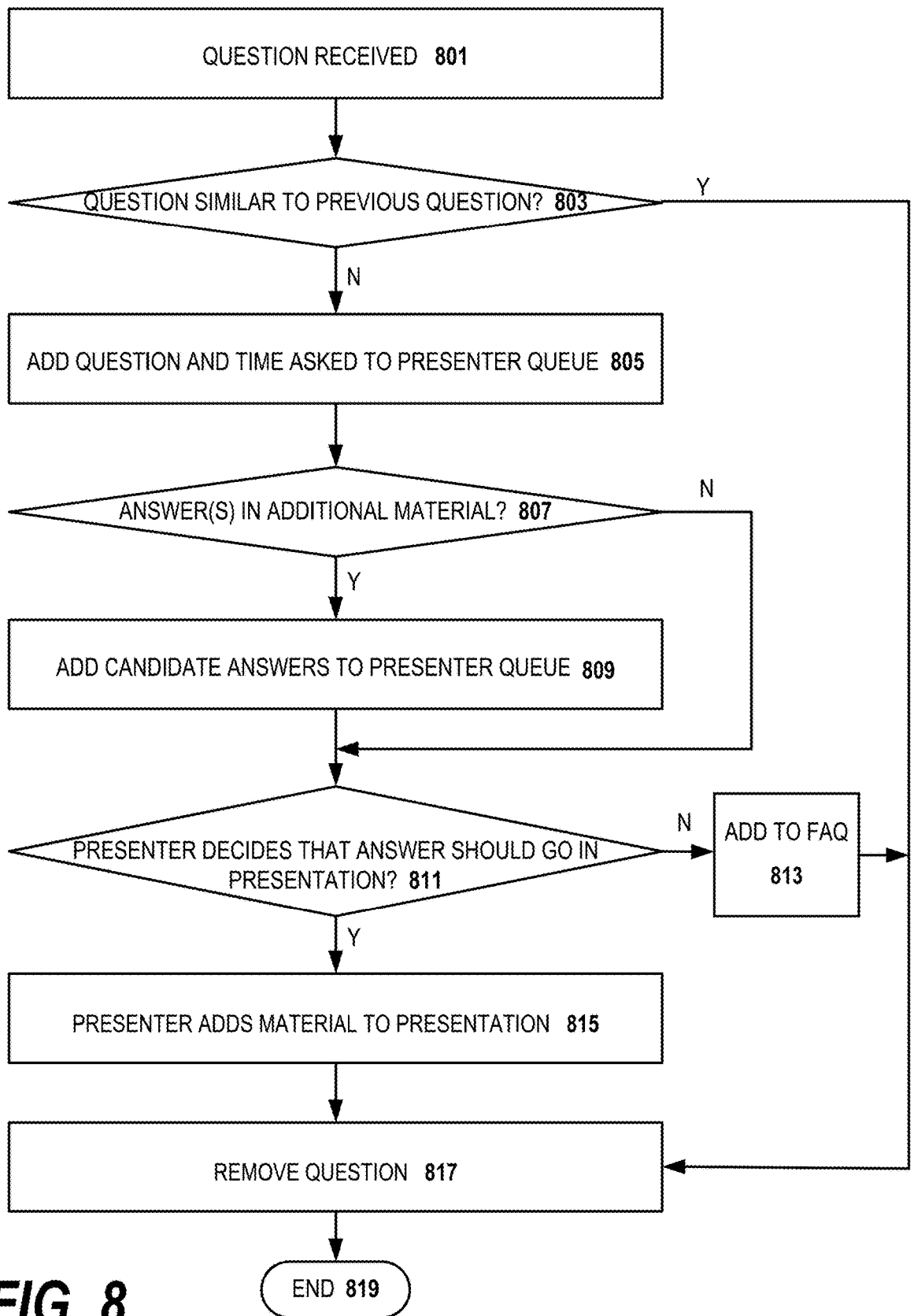
FIG. 8 depicts a flow diagram for an embodiment of the present invention for collecting question and answer related information during a web conference.

FIG. 8 depicts a flow diagram for an embodiment of the present invention for collecting question and answer related information during a web conference. Collecting this information adds to the quality of the system based on feedback learning. This information is used to continuously train the system of the relevancy score of new questions. Embodiments allow an active learning process to improve the presentation materials. For example, after a presentation, the presenter can look at the questions asked by the participants and manually mark the questions which were highly relevant. The machine learning nominates some questions as deserving presenter attention based on content similarity to the presentation and also mark other questions which are not relevant to the presentation.

In step 801, a question is received from a web conference participant. The system determines whether the question is similar to a previous question already asked, step 803. The method used to determine similarity can be a semantic analysis, like that used above for the in queue questions. Alternatively, in this step, a determination for similar questions is made based on the FAQs in the FAQ database or other supporting materials. If the question is similar to one already asked, the system removes the question from the queue so that the presenter is not faced with the task of going through repetitive questions. In some embodiments, the number of similar questions and times that they were asked in the presentation may be logged before removing the question. Giving priority to the most frequently asked questions improves the quality of the system and the presentation.

If not, in step 805, the system adds the question to the presenter. In some embodiments, the time a question was asked is added to the question queue to help give context to the presenter and/or system. In step 807, a search is performed to determine whether there are answers in the supporting material. The supporting material can include the presentation, prior versions of the presentation, the FAQ database as well as other supporting material which the presenter has selected as pertinent to the presentation. The supporting material can also include the questions and answers of the presentation just made. The participants' reactions to the answers presented, e.g., whether the participant accepts the answer or asks a new related question are used as indicia whether the answers were deemed to be correct. The system adds candidate answers to the presenter queue of questions in step 809.

In step 811, the presenter accepts one of the candidate answers to the question or provides an alternate answer. The presenter can decide to add the question and answer to the FAQ or other supporting material, step 813. Or based on the participant feedback, the presenter can decide to add material to presentation as a significant number of participants had an issue or question with the way the material was presented, step 815. The current question is removed from the queue in step 817. Although not illustrated in the drawing, the questions and answers can be presented sequentially to the presenter, and so each individual issue or question can be presented individual so the flow diagram would return to step 811. Once all of the questions have been addressed by the presenter, the process ends in step 819.

As is mentioned above, in embodiments of the invention, ingestion of the presentation, previous related presentations and indicated related material is performed by machine learning based processing. In these embodiments, cosine similarity is used to identify similar information with respect to previous question asked and determining relevance to the presentation or even with previous presentation content to the current presentation. In such embodiments, NLP is used for entity recognition and cosine similarity is used for correlation in content information.

The present invention has many advantages over the prior art. By buffering a question and contextually allowing a question to be forwarded to the presenter, a presentation is performed with a minimum of unneeded interruptions. This adds to the quality of the presentation for all participants. By determining the context of the question/comment, i.e. based on an identification of a type of participant response, only questions and relevant questions are forwarded to the presenter. Provided the presenter has not or will not answer a similar question in the during web conference (in which case the system responds to the participant), the question is relayed to the presenter is forwarded at an appropriate time in the presentation to optimize the necessary interruptions. If the question was already answered, the participant will stay muted and the system will pop up a notification providing the answer. In some embodiments, the answer is provided via a chat-bot on the participant's screen or via a voice interface only on the participant's line during the presentation. In these ways, the participants' questions will not interfere with the presenter and the other participants during the conference session.

If the question content will be presented in the future, the user will be notified that this topic will be addressed in the near future by similar means. Additionally, the system will screen for inappropriate or out of scope questions to prevent the conference from being delayed or sidetracked.

The order of steps in which the method is described is not intended to be construed as a limitation, and any number of the described method blocks may be combined in any order to implement the method, or an alternate method. Additionally, individual blocks may be deleted from the method without departing from the spirit and scope of the embodiments of the invention.

One skilled in the art will understand that the division of tasks between the modules is exemplary, and that other embodiments of the invention will divide the tasks differently. Further, in describing exemplary processes below, the order in which the processes are described with reference to the flow diagrams is not intended to be construed as a limitation, and any number of the described method blocks may be combined in a different order to implement the method, or alternate method. Additionally, individual blocks may be deleted from the method without departing from the spirit and scope of the subject matter described herein.

While a preferred operating environment and use case has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML or RESTful interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the module functions are implemented in software, which includes but is not limited to firmware, resident software, microcode, and the like. Furthermore, the interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows:

1. A method for controlling a web-based presentation comprising:
    analyzing presented content and future content of the web-based presentation;
    receiving a user question from a user terminal communicatively coupled to the web-based presentation;
    buffering the user question while determining whether content answering the user question has been or will be presented in the web-based presentation based on the analyzed content; and
    responsive to the determination, performing one of the following:
    1) responsive to a determination that the answering content has been, or will be, presented in the web-based presentation, maintaining the user question in a buffer state and providing the user a notification related to the answering content in a user interface; or
    2) responsive to a determination that the answering content has not been, and will not be, presented, releasing the user question from the buffer state to allow the user question to be forwarded to a presenter of the web-based presentation at a next break point during the web-based presentation.

2. The method as recited in claim 1, wherein responsive to a determination that the answering content has been presented, the method further comprises providing the user with the answering content in the notification in the user interface.

3. The method as recited in claim 1, wherein responsive to a determination that the answering content will be presented, the method further comprises including in the notification that the answering content will be presented in the web-based presentation.

4. The method as recited in claim 1, wherein analyzing upcoming content of the web-based presentation includes analyzing visual information in the web-based presentation and notes of the web-based presentation.

5. The method as recited in claim 1, further comprising preventing the user question from being forwarded to a presenter.

6. The method as recited in claim 1, further comprising analyzing the presented content of the web-based presentation including spoken information on an audio channel and visual information on a visual channel of the web-based presentation.

7. The method as recited in claim 1, wherein a plurality of user questions is received and the analyzing, receiving and buffering are performed for each of the questions, further comprising:
    after the determination, for the user questions where the determination is that the answering content has not been, and will not be, presented, and before releasing a user question, performing the following:
    grouping a set of user questions received from a plurality of participants, wherein the user questions are grouped by an intent of a respective question;

for each group of user questions, eliminating duplicate questions to create a reduced group of user questions; and forwarding the reduced group of user questions to the presenter.

8. The method as recited in claim 7, further comprising:

determining a priority of respective groups of user questions based on frequency; and forwarding reduced groups of user questions to the presenter based on highest priority.

9. Apparatus, comprising:

a processor;

computer memory holding computer program instructions executed by the processor for controlling a web-based presentation, the computer program instructions comprising:

program code, operative to analyze presented content and future content of the web-based presentation;

program code, operative to receive a user question from a user terminal communicatively coupled to the web-based presentation;

program code, operative to buffer the user question while determining whether content answering the user question has been or will be presented in the web-based presentation based on the analyzed content; and program code responsive to the determination operative to perform one of the following:

1) responsive to a determination that the answering content has been, or will be, presented in the presentation, maintaining the user question in a buffer state and providing the user a notification related to the answering content in a user interface; or 2) responsive to a determination that the answering content has not been, and will not be, presented, releasing the user question from the buffer state to allow the user question to be forwarded to a presenter of the web-based presentation at a next break point during the web-based presentation.

10. The apparatus as recited in claim 9, further comprising:

program code responsive to a determination that the answering content has been presented operative to provide the user with the answering content in the notification in the user interface.

11. The apparatus as recited in claim 9, further comprising:

program code, operative to accept a set of break points in the web-based presentation;

program code, operative to determine when a next break point of the set of break points will be in the web-based presentation; and program code, operative to wait until the next break point before releasing the user question from the buffer state.

12. The apparatus as recited in claim 11, further comprising program code, operative to provide a notification that the user question is in queue while the system waits for the next break point.

13. The apparatus as recited in claim 9, further comprising:

program code, operative to determine whether there are prior presentation materials or designated related materials related to the web-based presentation;

program code, operative to include the prior presentation materials or the designated related materials in a set of presentation materials;

program code, operative to analyze the set of presentation materials prior to running the web-based presentation;

program code, operative to create a knowledge source from the set of presentation materials;

program code, operative to determine whether there is the answering content in the knowledge source for a user question; and program code, operative to use the answering content in the knowledge source in the notification.

14. The apparatus as recited in claim 9, further comprising:

program code, operative to filter a plurality of user questions to find a set of user questions where the determination is that the answering content has not been, and will not be, presented;

program code, operative to group respective questions from the set of user questions received from a plurality of participants, wherein the user questions are grouped by an intent of a respective user question, producing at least a first group of user questions;

program code, operative to determine which is a most complete or representative user question for the first group of user questions; and program code, operative to forward the most complete or representative user question of the first group of user questions to the presenter.

15. A computer program product in a non-transitory computer readable medium for use in a data processing system, the computer program product holding computer program instructions executed by the data processing system for controlling a web-based presentation, the computer program instructions comprising:

program code, operative to analyze presented content and future content of the web-based presentation;

program code, operative to receive a user question from a user terminal communicatively coupled to the web-based presentation;

program code, operative to buffer the user question while determining whether content answering the user question has been or will be presented in the web-based presentation based on the analyzed content; and program code responsive to the determination operative to perform one of the following:

1) responsive to a determination that the answering content has been, or will be, presented in the presentation, maintaining the user question in a buffer state and providing the user a notification related to the answering content in a user interface; or 2) responsive to a determination that the answering content has not been, and will not be, presented, releasing the user question from the buffer state to allow the user question to be forwarded to a presenter of the web-based presentation at a next break point during the web-based presentation.

16. The computer program product as recited in claim 15, further comprising program code responsive to a determination that the answering content has been presented operative to provide the user with the answering content in the notification in the user interface.

17. The computer program product as recited in claim 16, further comprising:

program code, operative to determine break points in the web-based presentation, wherein a break point is determined by a slide change event or a pause in a presenter audio channel; and program code, operative to wait until a next break point before releasing the user question from the buffer state.

18. The computer program product as recited in claim 15, further comprising:

program code, operative to analyze the presented content of the web-based presentation, wherein the presented content includes spoken information presented on an audio channel and visual information presented on a visual channel of the web-based presentation;

program code, operative to use the analyzed presented content to create a context document; and program code, operative to use the context document to determine a current context for a user question.

19. The computer program product as recited in claim 15, further comprising:

program code, operative to filter a plurality of user questions to find a set of user questions where the determination is that the content has not been, and will not be, presented;

program code, operative to group the set of user questions received from a plurality of participants, wherein the user questions are grouped by an intent of a respective user question, forming at least one group of user questions;

program code, operative to eliminating duplicate user questions from each group of user questions to create a reduced group of user questions for each group of user questions; and program code, operative to forward the reduced groups of user questions to the presenter.

20. The computer program product as recited in claim 15, further comprising program code, operative to identify a participant by login or IP address information.

21. A method for controlling a web-based presentation comprising:

analyzing content of the web-based presentation;

receiving a user question from a user terminal communicatively coupled to the web-based presentation;

buffering the user question while determining whether content answering the user question is presented in the web-based presentation based on the analyzed content, wherein the determination includes whether the answering content will be presented in the web-based presentation;

responsive to the determination, modifying a user interface of the web-based presentation; and responsive to a determination that the answering content is not presented in the web-based presentation, releasing the user question from a buffer state to allow the user question to be forwarded to a presenter of the web-based presentation in the user interface of the web-based presentation at a next break point during the web-based presentation.

22. The method as recited in claim 21, further comprising:

responsive to a determination that the answering content is presented in the web-based presentation, maintaining the user question in a buffer state and providing the user a notification related to the answering content in the user interface.

23. The method as recited in claim 21, further comprising:

analyzing presented content of the web-based presentation, wherein the presented content includes spoken information presented on an audio channel and visual information presented on a visual channel of the web-based presentation;

using the analyzed presented content to create a context document; and using the context document to determine a current context for a user question.

\* \* \* \* \*